United States Patent [19]

Eino et al.

[11] Patent Number: 4,807,025

[45] Date of Patent: Feb. 21, 1989

[54] ELECTRONIC ENDOSCOPE APPARATUS

[76] Inventors: Teruo Eino, No. 5-16-1-126, Sanda-cho, Hachioji-shi, Tokyo, Japan; Tohru Takei, No. 560-11, Kitano-cho, Hachioji-shi, Tokyo, Japan

[21] Appl. No.: 109,799

[22] Filed: Oct. 16, 1987

[30] Foreign Application Priority Data

Oct. 23, 1986 [JP] Japan .................... 61-252576
Nov. 4, 1986 [JP] Japan .................... 61-263000
Mar. 23, 1987 [JP] Japan .................... 62-068577

[51] Int. Cl.$^4$ ............................... H04N 7/18
[52] U.S. Cl. ................... 358/98; 358/901; 128/4; 128/6
[58] Field of Search ............ 358/98, 901; 128/4, 128/6

[56] References Cited

U.S. PATENT DOCUMENTS

| | | | |
|---|---|---|---|
| 4,074,306 | 2/1978 | Kakinuma et al. | 358/1 |
| 4,148,069 | 4/1979 | Smiley et al. | 358/160 |
| 4,539,586 | 9/1985 | Danna et al. | 358/98 |
| 4,667,229 | 5/1987 | Cooper et al. | 358/98 |
| 4,667,230 | 5/1987 | Arakawa et al. | 358/98 |
| 4,697,208 | 9/1987 | Eino | 358/32 |
| 4,706,118 | 11/1987 | Kato et al. | 358/98 |

FOREIGN PATENT DOCUMENTS 0218226  4/1987  European Pat. Off. .
61-2120  1/1986  Japan .

*Primary Examiner*—James J. Groody
*Assistant Examiner*—John K. Peng

[57] ABSTRACT

In this electronic endoscope apparatus, a waveform compensating device compensating the waveform of a driving pulse applied to a solid state imaging device is provided within a light source connector, an information signal generating device generating an information signal relating to the kind of the electronic endoscope is provided within a signal connector and a selecting device decoding the above mentioned information signal and outputting a control signal to a video signal processing circuit device is provided within a control device.

20 Claims, 9 Drawing Sheets

FROM HUE CONTROLLER

ELECTRONIC ENDOSCOPE APPARATUS

FIELD OF THE INVENTION

This invention relates to an electronic endoscope apparatus provided with a solid state imaging device in the tip part of an insertable part of an endoscope. More particularly the invention relates to an electronic endoscope apparatus wherein, using an outside signal processing device, driving pulses to a solid state imaging device are generated and signals obtained from the solid state imaging device are processed and the waveform distortion is compensated when the driving pulses are transmitted to the solid state imaging device.

BACKGROUND OF THE INVENTION

Recently, with the development of the solid state imaging device, there has been developed an electronic endoscope whereby a body cavity interior is imaged with a solid state imaging device such as a charge coupled device (CCD) contained in the tip part of the endoscope. The picture image from the solid state imaging device is displayed by an external displaying device.

Usually, the light source of an endoscope is provided as a light source device separate from the body. The endoscope is connected to the light source device through a light source connector branched from the body. The illuminating light from the light source device is radiated onto an object to be imaged through a light guide fiber bundle.

In an electronic endoscope such as described above, a driving pulse generating circuit for generating driving pulses for driving the solid state imaging cevice and a video image processing circuit for videoprocessing the picture image signals from the solid state imaging device are required. Usually, these circuit units are provided within a video processor separate from the endoscope body the same as in the light source device. The driving pulses to the solid state imaging device are fed to the solid state imaging device through signal lines within the endoscope body.

Generally, endoscopes of various lengths and diameters are prepared depending on the position in which the endoscope is to be inserted. The same solid state imaging device is used for any kind of electronic endoscope so that such a circuit unit may be used in common for any kind of electronic endoscope. However, if the length of the endoscope is different, the distance of the signal line from the circuit unit within the light source device to the solid state imaging device at the tip of the endoscope will also be different in response to it and have a disadvantage such in the following. Generally, when the length of the signal transmitting line becomes longer, the waveform of the clock pulse fed to the solid state imaging device from the driving circuit will distorted and will be no longer be an accurate rectangular waveform and the solid state imaging device will not be accurately driven. The influence of the distortion of the waveform while transmitting this signal is different with the length of each endoscope. Therefore it has been impossible to connect a plurality of electronic endoscopes of different lengths to the driving circuit of one unit.

Therefore, with a formation such as shown in FIG. 1, the waveform distortion of clock pulses by the difference of the length of the endoscope, that is, the distance of the signal line from the video processor to the solid state imaging device in the tip part of the endoscope has been compensated.

In FIG. 1, in the tip part of the endoscope 10, a charge coupled device (CCD) 12 as a solid state imaging device is contained to image a body cavity interior. The illuminating light from a light source device 14, separate from the endoscope 10, is to illuminate the body cavity interior through a light guide fiber bundle 16. The light source 14 has a light source lamp 18 and a lens 20 condensing the light from the light source lamp 18 to the end of the light guide fiber bundle 16.

On the other hand, the signal obtained from the CCD 12 in the tip part of the endoscope 10 is fed to a video signal processing circuit 28 through a differential amplifier 26 within a video processor 24. The output of the video signal processing circuit 28 is displayed by a displaying device (for example, a CRT display) 30.

The video processor 24 is further provided with a driving pulse generating circuit 32 and a constant voltage source circuit 34. The output signal of the constant voltage source circuiut 34 is fed as a substrate bias voltage $V_{sub}$ to the CCD 12. The driving pulse generatign circuit 32 generates horizontal driving pulse $\phi H_1$ and $\phi H_2$, a resetting pulse $\phi R$ and vertical driving pulses $\phi V_1$ and $\phi V_2$. The horizontal driving pulses $\phi H_1$ land $\phi H_2$, resetting pulse $\phi R$ and vertical driving pulses $\phi V_1$ and $\phi V_2$ are fed to the CCD 12 respectively through horizontal driving circuits 40 and 42, a resetting pulse driving circuit 44 and vertical driving circuits 46 and 48. The respective driving circuits 40, 42, 44, 46 and 48 are circuits amplifying the voltages of the respective pulses to predetermined voltages.

As the waveforms are distorted during the transmission through signal lines, the horizontal driving pulses $\phi H_1$ and $\phi H_2$ and resetting pulse $\phi R$ are fed respectively to waveform compensatign circuits 50, 52 and 54 for compensating the waveform distortions in advance. The waveform compensating circuits 50, 52 and 54 are to differentiate the input pulses and to superpose them on the driving pulses so that, when reaching the CCD 12, the driving pulses will be accurate rectangular waves. Here, in order that the video processor 24 may be connected to a plurality of endoscopes of different kinds (lengths), the respective waveform compensating circuits are provided with a plurality of differentiating circuits of different time constants. Input pulses are input into respective differentiating circuits, the outputs of all the differentiating circuits are fed to switching circuits 56, 58 and 60 and any one signal is selected by the kind (length) discriminating signal of an endoscope not illustrated. The switching circuits 56, 58 and 60 are provided with relay switches or the like connected to the outputs of the respective differentiating circuits.

As the vertical driving pulses $\phi V_1$ and $\phi V_2$ are signals of frequencies lower than of the horizontal driving pulses $\phi H_1$ and $\phi H_2$ and resetting pulse $\phi R$, the influence of the waveform distortion during the transmission through signal lines will be low. Therefore, no waveform compensating circuit is provided here.

Now, according to the above mentioned formation, if the kinds of the endoscope are n kinds, 3n differentiating circuits and 3n relay switches will be required. Thus, the video processor 24 has come to be large and the cost has been high.

Further, due to the fluctuation in the production of the CCD, the optimum voltage value of the direct current voltage ($V_{sub}$) fed to the CCD 12 is different with the devices. However, heretofore, it has been set at a representative voltage by neglecting this difference. Therefore, the performance of the CCD 12 has not been able to be well developed.

In U.S. Pat. No. 4,667,229, it is shown that an endoscope includes a means of generating a signal discriminating the parameter value, a controlling device connecting the endoscope includes a means of responding to the above mentioned parameter discriminating signal and various endoscopes can be used. However, in this prior art, no driving pulse waveform compensating means is provided.

OBJECTS AND SUMMARY OF THE INVENTION

An object of the present invention is to compensate driving pulse waveform distortions with a simple formation in an electronic endoscope.

The electronic endoscope apparatus according to the present invention comprises an endoscope having a solid state imaging device in the tip part, a controlling device generating an illuminating light, generating a driving pulse to the solid state imaging device and processing the signal obtained from the solid state imaging device and a waveform compensating means compensating in advance the waveform distortion when the driving pulse is transmitted to the solid state imaging device and provided within a light source connector of the endoscope.

The other features and advantages of the present invention will become apparent enough with the following explanation.

BRIEF DESCRIPTION OF THE DRAWINGS

FIG. 2 is a block diagram of an electronic endoscope.

FIG. 3 is a block diagram of a video processing circuit of a field sequential system.

FIG. 4 is a block diagram of a video processing circuit of a color mosaic filter system.

FIG. 5 is an explanatory view showing the formation of a delay line.

FIG. 6 is a waveform diagram showing a driving pulse, video signal and sample holding pulse of a solid state imaging device.

FIG. 7 is a block diagram of an electronic endoscope apparatus.

FIG. 8 is a block diagram of a video processing circuit.

FIG. 9 is a block diagram showing an example of a tone controlling part.

FIG. 10 is a block diagram showing another modification example of a tone controlling part.

DESCRIPTION OF PREFERRED EMBODIMENTS

The present invention shall be explained in detail in the following with reference to the drawings.

Figure 1:
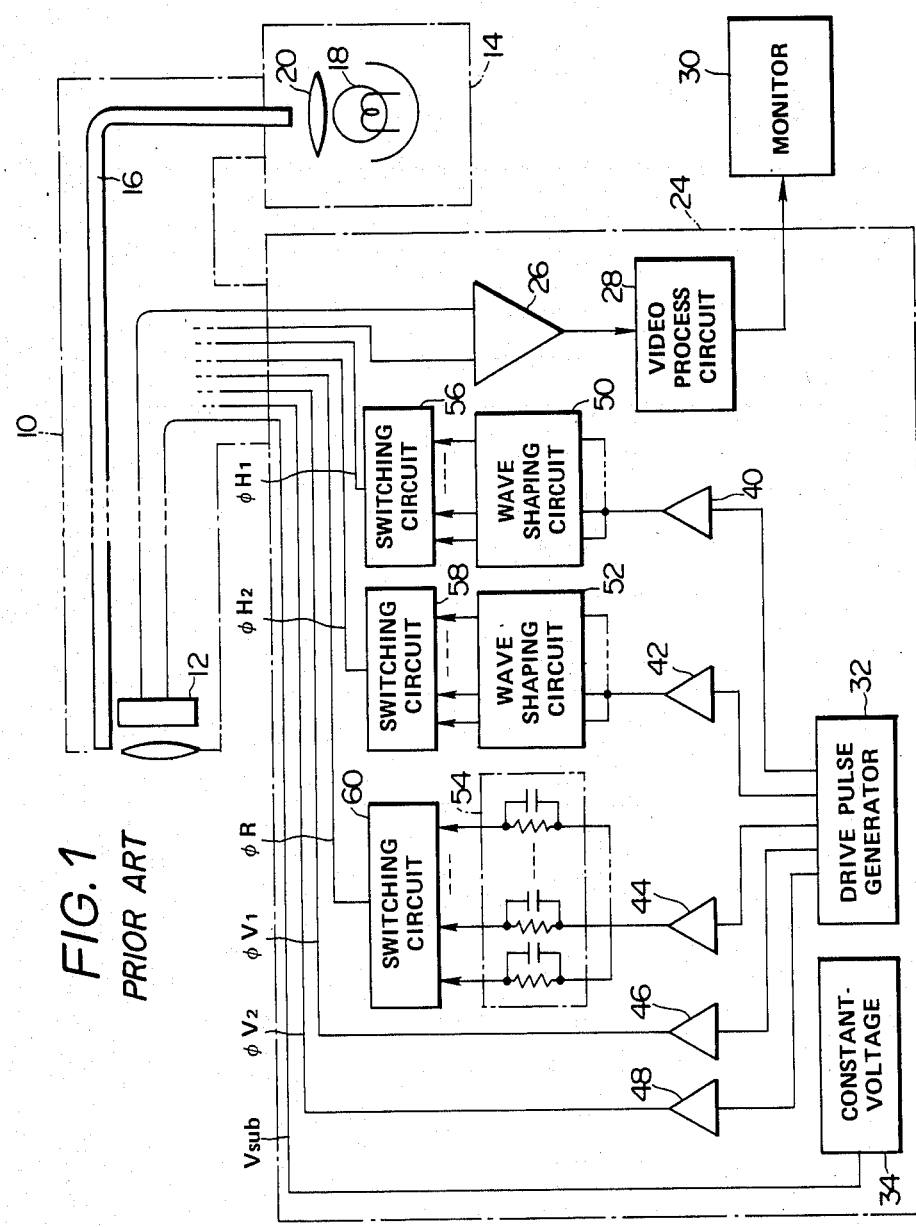
FIG. 1 is a block diagram of a conventional electronic endoscope.
Figure 2:
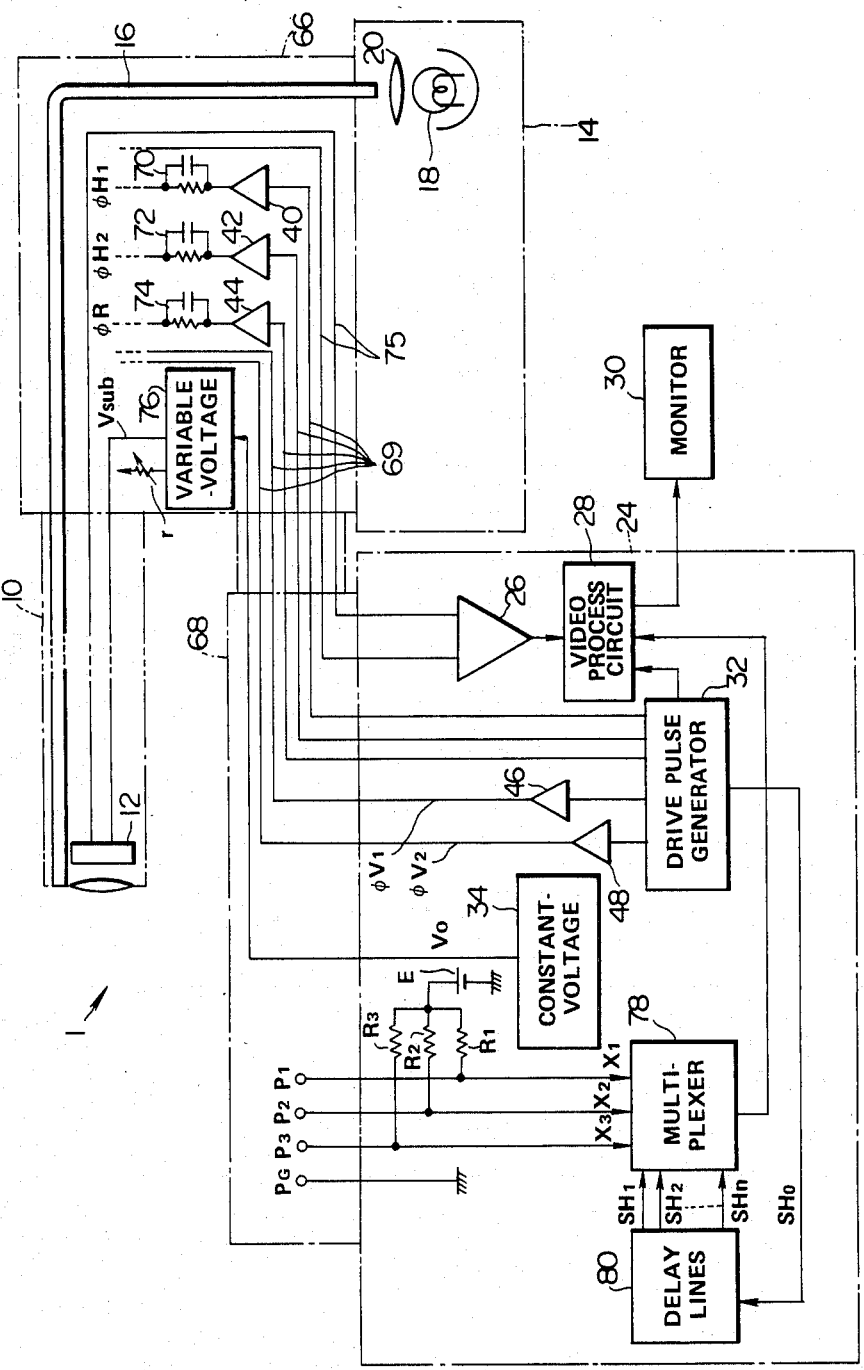
FIGS. 2 to 6 relate to the first embodiment of the present invention.

FIG. 2 is a block diagram of the first embodiment. An endoscope apparatus 1 comprises an endoscope 10, light source device 14, video processor 24 and displaying device 30. The endoscope 10 is connected to the light source device 14 and video processor 24 respectively through a light source connector 66 and signal connector 68. A signal line 69 from the video processor 24 is connected to a CCD 12 through the signal connector 68 and light source connector 66. The displaying device (for example, a CCD display) 30 is connected to the video processor 24.

The light from a light source lamp 18 within the light source device 14 is incident upon a light guide fiber bundle 16 through a condenser lens 20 and is led to the tip of the endoscope 10 through the light guide fiber bundle 16 to illuminate a body cavity interior.

The CCD 12 in the tip part of the endoscope 10 photoelectrically converts an observed image formed on an imaging plane, synchronizes it to a driving pulse and outputs it as a video signal. This video signal is delivered through a signal line 75, is amplified by a differential amplifier 26 provided within the video processor through the light source connector 66 and signal connector 68 and is fed to the video signal processing circuit 28. The video signal processing circuit 28 outputs a compound video signal or the like to the displaying device 30 and the observed image is displayed on a picture surface of the displaying device 30.

The video processor 24 is further provided with a driving pulse generating circuit 32, constant voltage source circuit 34, multiplexer 78 and delay line 80 having a plurality of taps. The output signal $V_o$ of the constant voltage source circuit 34 is fed to a variable voltage source circuit 76 within the light source connector 66 through the signal connector 68. The output $V_{sub}$ of the variable voltage source circuit 76 is fed to the CCD 12 as a substratae bias voltage. The variable voltage source circuit 76 is adjusted to generate a substrate bias voltage inherent to the CCD 12 by adjusting an outside fitted variable resistance r.

The driving pulse generating circuit 32 generates horizontal driving pulses $\phi H_1$ and $\phi H_2$, a resetting pulse $\phi R$ and vertical driving pulses $\phi V_1$ and $\phi V_2$. The vertical driving pulses $\phi V_1$ and $\phi V_2$ are amplified to a predetermined voltage respectively through vertical driving circuits 46 and 48 and are then fed to the CCD through the light source connector 66 from the signal connector 68.

The horizontal driving pulses $\phi H_1$ and $\phi H_2$ and resetting pulse $\phi R$ are fed to the light source connector 66 through the signal connector 68 and are amplified to a predetermined voltage respectively by the horizontal driving circuits 40 and 42 and resetting driving circuit 44 therein. The outputs of the horizontal driving circuits 40 and 42 and resetting driving circuit 44 are fed respectively to differentiating circuits 70, 72 and 74 for compensating waveforms to compensate waveform distortions in advance. The time constants of the differentiating circuits 70, 72 and 74 are determined in response to the length of the endoscope 10. The outputs of the differentiating circuits 70, 72 and 74 are fed to the CCD.

Figure 3:
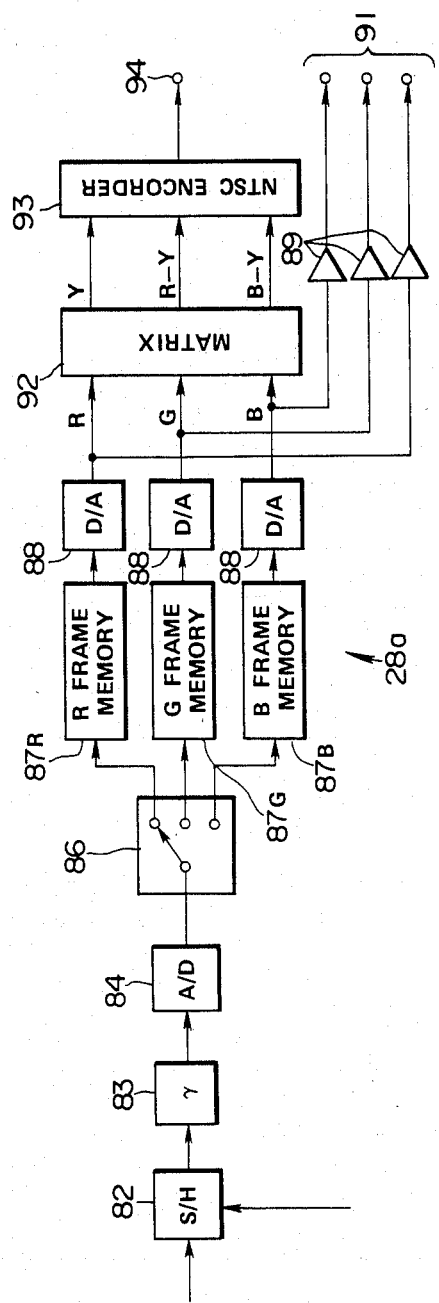
Figure 4:
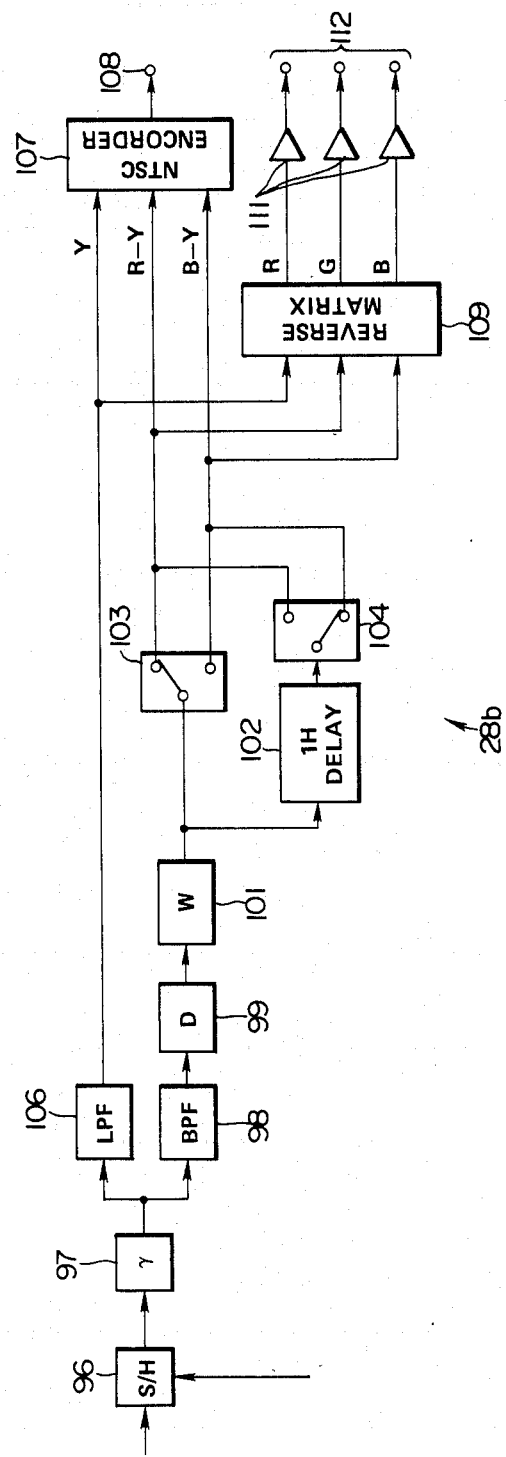

The above mentioned video signal processing circuit 28 is formed as in FIG. 3 in the case of a field sequential system and as in FIG. 4 in the case of a color mosaic filter system.

In FIG. 3, the video signal processing circuit 28a of the field sequential system is formed as follows:

That is to say, the dignal input through the differential amplifier 26 is input into a sample holding circuit 82 to hold a sample, is then γ-corrected by a γ-correcting circuit 83 and is converted to a digital signal by an A/D converter 84.

The signal imaged under the field sequential illuminations of R(red), G(green) and B(blue) through the multiplexer 86 is written into an R frame memory 87R, G frame memory 87G and B frame memory 87B. The signal data written into three respective frame memories 87R, 87G and 87B are simultaneously read out, are converted respectively to analogue color signals R, G and B by D/A converter 88 and are output as three primary color signals R, G and B from three primary color output terminals 91 through a driver formed of a buffer 89. The above mentioned color signals R, G and B pass through a matrix circuit 92 to produce a brightness signal Y and color difference signals R-Y and B-Y, are then input into an NTSC encoder 93, are converted to compound video signals of an NTSC system and are output from an NTSC terminal 94.

The video signal processing circuit 28b of a color mosaic fiber system is formed, for example, as in FIG. 4.

That is to say, the signal to be input through the differential amplifier 26 is input into a sample holding circuit 96 to hold a sample and is then γ-corrected by a γ-correcting circuit 97 and is passed, on one hand, through a band pass filter 98, wave detecting circuit 99, white balance circuit 101 and 1H delay circuit 102 to obtain two different color difference signals synchronized by switches 103 and 104. On the other hand, the output of a low-pass filter 106 is input as a brightness signal component into an NTSC encoder 107, is converted to a compound video signal of an NTSC system and is output from an NTSC output terminal 108. Also, it is input into an inverse matrix circuit 109 and is converted to color signals R, G and B and three primary color signals R, G and B are output from three primary color signal output terminals 112 through buffers 111.

Now, for example, four contact pins $P_1$, $P_2$ $P_3$ and $P_G$ representing the length of the signal line 69 delivering a driving pulse to the CCD 12 are provided within the signal connector 68. In response to these pins $P_1$, $P_2$, $P_3$ and $P_G$, on the video processor 24 side, when the signal connector 68 is connected to the video processor 24, the above mentioned contact pins $P_1$, $P_2$ and $P_3$ are to be connected respectively to wirings conecting respective address input terminals $X_1$, $X_2$ and $X_3$ of a multiplexer 78 with a circuit source E through pull-up resistances $R_1$, $R_2$ and $R_3$. The pin $P_G$ is so wired as to be connected to ground. Therefore, in case the above mentioned pins $P_1$, $P_2$ and $P_3$ are all open (no wiring is made), the H level will be all applied to the respective address input terminals $X_1$, $X_2$ and $X_3$ of the above mentioned multiplexer 78. For example, in case the pin $P_1$ only is connected to the pin $P_G$ on the electronic endoscope side, the L level will be applied to the address input terminal $X_1$ and the H level will be applied to the address input terminals $X_2$ and $X_3$. Thus, depending on the manner of connecting the above mentioned pins $P_1$, $P_2$ and $P_3$ with the pin $P_G$, $2^3 = 8$ addresses can be designated in the above mentioned multiplexer 78. That is to say, 8 kinds of lengths of signal lines can be represented.

By the above mentioned multiplexer 78, one of the sample holding pulses $SH_1$ to $SH_n$ output from the delay line 80 fitted with a plurality of taps is selected according to the addresses designated by the above mentioned contact pins $P_1$, $P_2$, $P_3$ and $P_G$ and is delivered to the sample holding circuit 82 or 96 included within the video signal processing circuit 28.

Figure 5:
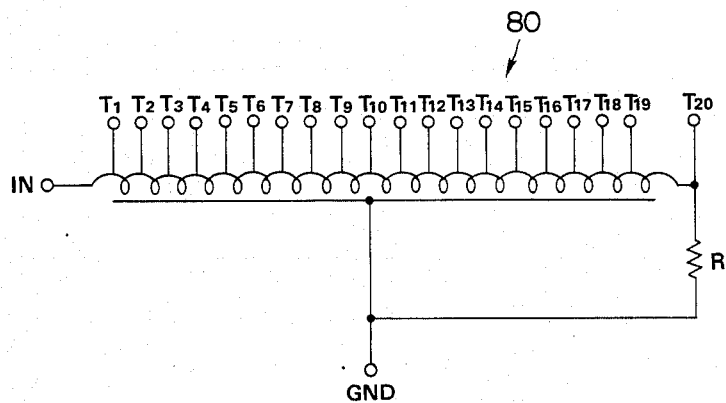

As shown, for example, in FIG. 5, the above mentioned delay line 80 fitted with a plurality of taps is formed of an input terminal IN provided at one end of a coil, a plurality of taps $T_1$ to $T_n$ (in the illustrated example, n=20) provided in the course of the above mentioned coil and, at the other end, a GND terminal for grounding an an impedance coordinating resistance connected between the other end of the above mentioned coil and the above mentioned GND terminal for grounding. A reference sample holding pulse $SH_o$ generated by the above mentioned driving pulse generating circuit 32 and input into the above mentioned input terminal IN is delayed little by little by different delay amounts and is output as sample holding pulses $SH_1$ to $SH_n$ from the above mentioned taps $T_1$ to $T_n$. An SDL 100N500 (produced by J.P.C. Company, Ltd.) or the like can be used for this delay line 80. Also, the above mentioned delay line 80 may be of a distributed constant type by a coil as shown in FIG. 5, a concentrated constant type in which LC's are connected in a multi-step vertical row or a quasi-distributed constant type having the features of the distributed constant type and concentrated constant type.

In the above mentioned endoscope 10, the connection of the above mentioned pins $P_1$, $P_2$ and $P_3$ with the pin $P_G$ is determined for the respective lengths, that is, for the respective lengths of the signal lines 69 and 75 and, by the above mentioned multiplexer 78, a sample holding pulse SH of an optimum timing for each electronic endoscope 10 is selected from among the sample holding pulses $SH_1$ to $SH_n$ according to addresses designated depending on the manner of connecting the above mentioned pins $P_1$, $P_2$, $P_3$ and $P_G$ and is delivered to the above mentioned sample holding circuit 82 or 96. That is to say, as shown in FIG. 6(e), the above mentioned sample holding pulse SH is output at a timing conforming to the video component of the video signal $V_1$ with a delay time $t_2$ including the delay times $t_1$ by the above mentioned signal lines 69 and 75 for the above mentioned horizontal driving pulse $\phi H_1$ and $\phi H_2$ and resetting pulse $\phi R$ (which shall be called driving pulses $\phi_o$ hereinafter).

In this embodiment formed as in the above, a plurality of electronic endoscopes 10 can be connected as replaced with the video processor 24 by the signal connector 68. The illuminating light from the above mentioned light source device 14 is radiated into a body cavity through the light guide fiber bundle 16 to illuminate an object to be imaged. On the other hand, the horizontal driving pulses $\phi H_1$ and $\phi H_2$, resetting pulse $\phi R$ and vertical driving pulses $\phi V_1$ and $\phi V_2$ are output from the driving pulse generating circuit 32. The horizontal driving pulses $\phi H_1$ and $\phi H_2$ and resetting pulse $\phi R$ are amplified to a predetermined voltage by the horizontal driving circuits 40 and 42 and resetting driving circuit 44 and are fed respectively to the waveform compensating differentiating circuits 70, 72 and 74. The horizontal driving pulses $\phi H_1$ and $\phi H_2$ and resetting pulse $\phi R$ having had the waveform distortions compensated in advance are output to the CCD 12 as driving pulses $\phi_o$ as shown in FIG. 6(a). The vertical driving pulses $\phi V_1$ and $\phi V_2$ are amplified to a predetermined voltage by the vertical driving circuits 46 and 48 and are then fed to the CCD 12. Among the horizontal driving pulses $\phi H_1$ and $\phi H_2$, resetting pulse $\phi R$ and vertical driving pulses $\phi V_1$ and $\phi V_2$ at the terminal of this CCD, particularly the horizontal driving pulses $\phi H_1$ and $\phi H_2$ and resetting pulse $\phi R$, that is, the driving pulses $\phi_1$ are delayed by the time $t_1$ proportional to the length of the above mentioned signal line 69 from the above mentioned driving pulses $\phi_o$ as shown in FIG. 6(b) due to the length of the signal line 69.

The signals corresponding to the respective picture elements of the above mentioned CCD 12 are read out by the above mentioned driving pulses $\phi_1$ and the above mentioned CCD 12 is synchronized with the above mentioned driving pulses $\phi_1$ and outputs such video signal $V_o$ as is shown in FIG. 6(c). This video signal $V_o$ is input into the sample holding circuit 82 or 96 within the above mentioned video processor 24 through the signal line 75 inserted through the above mentioned electronic endoscope. The video signal $V_1$ input into this sample holding circuit 82 or 96 is delayed by the time $t_1$ proportional to the length of the above mentioned signal line 75 from the above mentioned video signal $V_o$ as shown in FIG. 6(d).

On the other hand, a reference sample holding pulse $SH_o$ is output from the above mentioned driving pulse generating circuit 32. This reference sample holding pulse $SH_o$ is output always in a fixed timing relation with the above mentioned driving pulse $\phi_o$. The above mentioned reference sample holding pulse $SH_o$ is input into the delay line 80 fitted with a plurality of taps.

The reference sample holding pulse $SH_o$ input into the above mentioned delay line 80 is delayed by a little by little different delay amount and is output as sample holding pulses $SH_1$ to $SH_n$ from the taps. These sample holding pulses $SH_1$ to $SH_n$ are input into the multiplexer 78.

Figure 6:
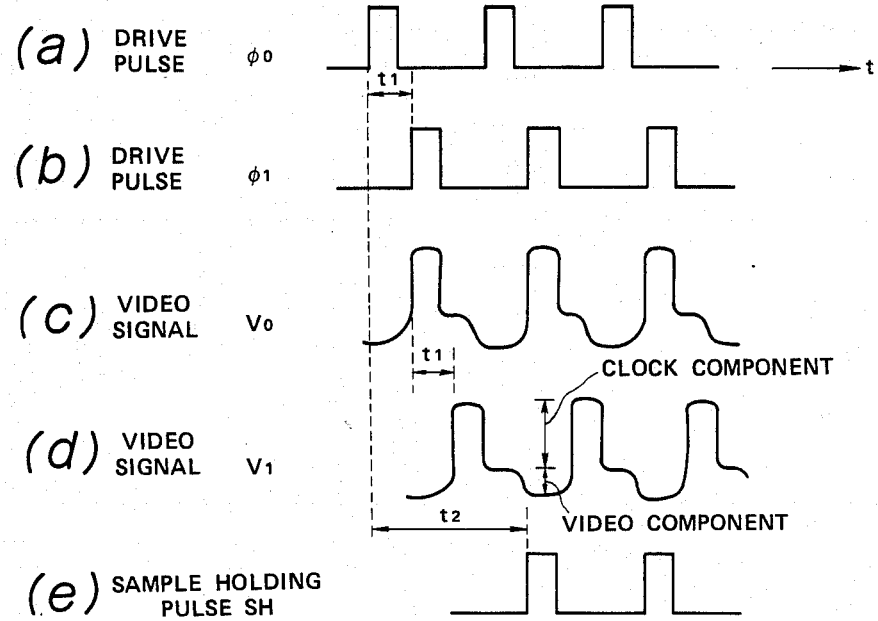

By the above mentioned multiplexer 78, a sample holding pulse SH of an optimum timing, that is, a timing having the delay time of $t_2$ including the delay time $t_1$ by the above mentioned signal lines 69 and 75 from the driving pulse $\phi_o$ as shown in FIG. 6 and conforming to the video component of the above mentioned video signal $V_1$ is selected for the respective electronic endoscopes 10 from among the sample holding pulses $SH_1$ to $SH_n$ according to the addresses designated depending on the manner of connecting the pins $P_1$, $P_2$, $P_3$ and $P_G$ provided in the above mentioned signal connector 68 and is delivered to the above mentioned sample holding circuit 82 or 96.

The above mentioned video signal $V_1$ has the video component except the clock component extracted by the above mentioned sample holding circuit 82 or 96. This video component is processed to be a video signal by the video signal processing circuit 28 and is input into the displaying device 30 to display the imaged body.

In the delay line 80 shown in FIG. 5, if the maximum delay amount is 200 n sec., sample holding pulses $SH_1$ to $SH_{20}$ having delay amounts, for example, of alternately 10 n sec. will be obtained from the respective taps $T_1$ to $T_{20}$. Generally, when the length of the electronic endoscope 10 becomes 1 m. longer, the time required for the electric signal to reciprocate will become about 10 n sec. longer. Therefore, by using this delay line 80, a plurality of kinds (or 8 kinds in the illustrated example) of the electronic endoscopes 10 of any length (at a unit of about 1 m.) can be selected from among electronic endoscopes 10 of a difference of about 20 m. between the shortest length and the longest length and can be used as combined with the same video processor 24.

Thus, according to the first embodiment, as the differentiating circuits 70, 72 and 74 for compensating the waveforms of the horizontal driving pulses $\phi H_1$ and $\phi H_2$ and resetting pulse $\phi R$ are provided within the light source connector 66, the waveforms for the respective endoscopes are compensated in the distortions and can be replaced and connected to the video processor 24. This compensating circuit is inherent to the endoscope and is therefore of a simple formation. Therefore, three times as many differentiating circuits and relay switches as the kinds of endoscopes need not be provided within the video processor 24 and any endoscope is driven by a common video processor (driving pulse generating circuit). Further, as the variable voltage current source circuit 76 is provided within the light source connector 66, the substrate bias voltage $V_{sub}$ is adjusted for the respective endoscopes (CCD 12). Therefore, even if the thicknesses of the P layer and N layer fluctuate while the CCD 12 is being produced, and optimum direct current substrate bias voltage will be always applied to the CCD 12 to efficiently drive the CCD 12.

Further, according to this embodiment, by one driving pulse generating circuit 32 and one delay line 80 fitted with a plurality of taps, a plurality of sample holding pulses of different timings can be output, therefore a plurality of sample holding pulse generating circuits need not be provided, the circuit formation of the video processor 24 connectable with a plurality of electronic endoscopes of different lengths can be simplified and the apparatus can be made that much smaller and cheaper.

Also, the delay amount of the above mentioned delay line 80 is so high in precision that the timing of the sample holding pulse need not be adjusted.

By using the above mentioned delay line 80 having many taps, even in the casse of using the electronic endoscope 10 of a new length, by selecting taps of optimum delay amounts from among the above mentioned taps, the sample holding pulse generating circuit need not be replaced in the process.

In this embodiment, the number of the taps of the delay line 80 fitted with a plurality of taps and the spacing of the delay amounts between the respective taps can be freely set.

The address of the multiplexer 78 may be set not only by the pins provided in the signal connector 68 but also by a setting means provided on the video processor 24 side.

Figure 7:
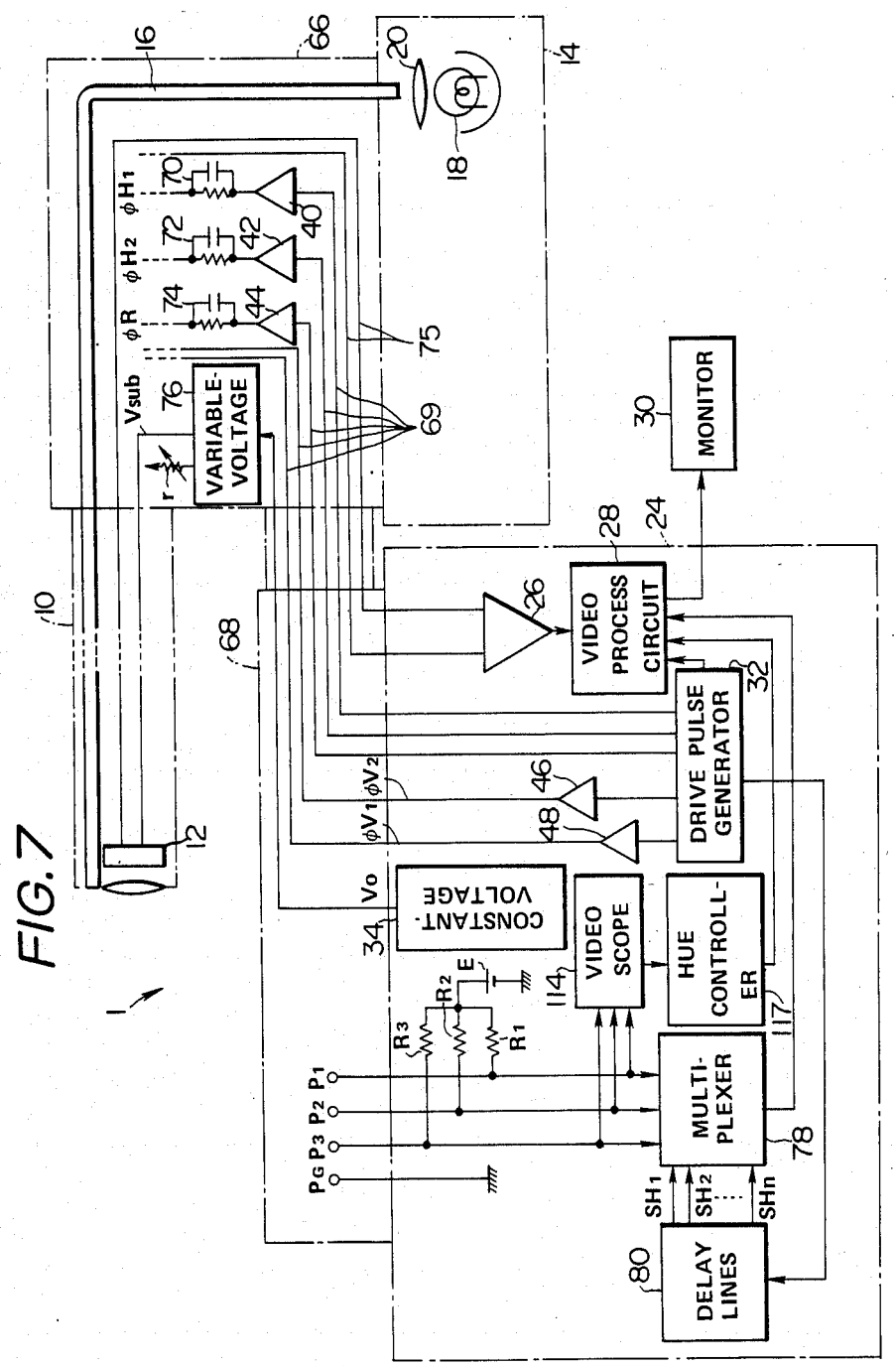
FIGS. 7 to 10 relate to a modification of the first embodiment.
Figure 8:
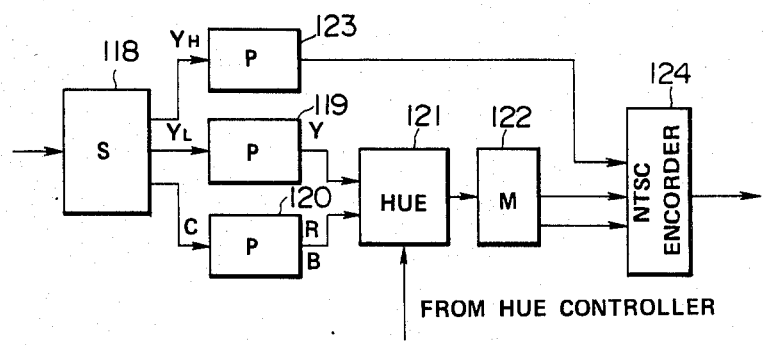
Figure 9:
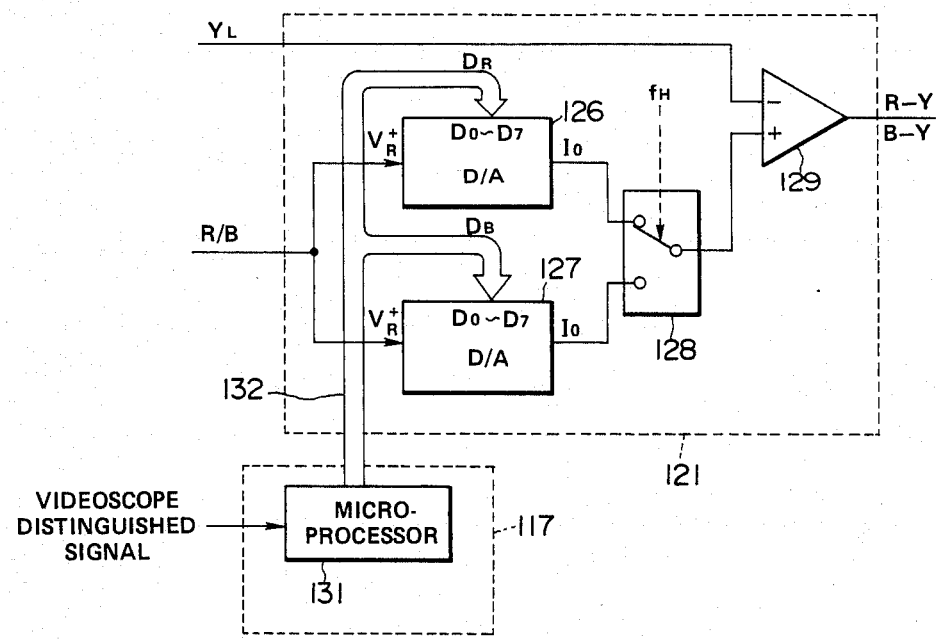
Figure 10:
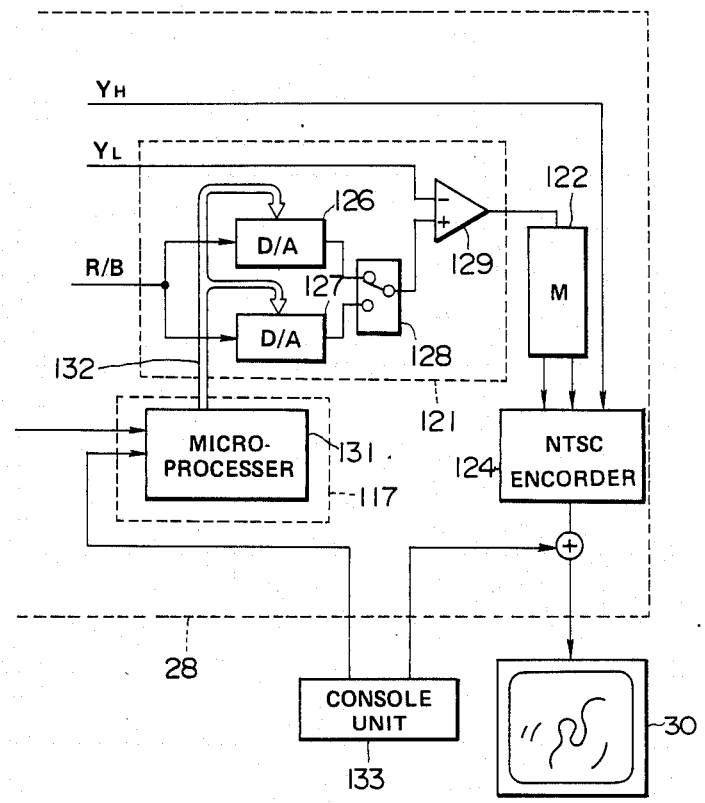

FIGS. 7 to 10 relate to a modification of the first embodiment. FIG. 7 is a block diagram of an electronic endoscope apparatus. FIG. 8 is a block diagram of a video signal processing circuit. FIG. 9 is a block diagram showing an example of a tone controlling part. FIG. 10 is a block diagram showing another modification of the tone controlling part.

In FIG. 7, contact pins $P_1$, $P_2$, $P_3$ and $P_G$ provided within the signal connector 68 are connected respectively to the respective address input terminals $X_1$, $X_2$ and $X_3$ of the multiplexer 78, endoscope discriminating circuit 114 and ground. By the multiplexer 78, the information signal depending on the manner of connecting the above mentioned contact pins $P_1$, $P_2$ and $P_3$ with $P_G$ is decoded as the information of the lengths of the signal lines 69 and 75 and a sample holding pulse adapted to it is selected. Also, by the endoscope discriminating circuit 114, the above information signal is decoded as information representing the spectral characteristic of the light guide fiber bundle 16 inserted through the endoscope 10 and an endoscope discriminating signal is output and is fed to a tone controlling circuit 117. By this tone controlling circuit 117, a tone controlling signal corresponding to the endoscope 10 is output to the video signal processing circuit 28.

In FIG. 8, there is provided a brightness signal-color signal separating circuit 118 separating the video signal amplified by the differential amplifier 26 into a brightness signal $Y_H$, brightness signal $Y_L$ of only a low range component and color signal C. The brightness signal $Y_L$ of only a low range component and the color signal C are fed to a tone circuit 121 respectively through processing circuits 119 and 120. In the tone circuit 121, a red color difference signal R-Y which is a difference between the brightness signal and color signal and a blue color difference signal B-Y are output alternately for each horizontal scanning line. These color difference signals R-Y and B-Y are then fed to a synchronizing circuit 122 including a memory circuit to simultaneously generate the red color difference signal R-Y and blue color difference signal B-Y for each horizontal scanning line. On the other hand, the brightness signal $Y_H$ is fed to an encoder 124 through a processing circuit 123. The color difference signals R-Y and B-Y from the synchronizing circuit 122 are also fed to this encoder 124. A compound color television signal, for example, of an NTSC system is made and is fed to the displaying device 30 to display a color picture image.

The tone controlling signal output from the above described tone controlling circuit 117 is fed to the tone circuit 121 and the color tone is automatically adjusted in response to the kind of the endoscope 10. That is to say, as the spectral characteristic of the light guide is different depending on the kind of endoscope, by controlling the tone in response to the spectral characteristic of the light guide of each endoscope, the optimum color reproduction can always be made. In this modification, the video signal is separated into a brightness signal and color signal and then the gain of this color signal is automatically controlled by the tone controlling signal to adjust the tone. In such a formation, the color difference signal vector varies in parallel with the R-Y axis and B-Y axis and the tone can be easily and accurately adjusted.

FIG. 9 shows an embodiment of the formation of the part controlling the tone with the endoscope discriminating signal of the video signal processing circuit 28 shown in FIG. 8. The red color signal R and blue color signal B alternately output for each horizontal scanning line from a processing circuit shown in FIG. 8 are fed respectively to D/A converters 126 and 127 of the tone circuit 121 and are further fed to the irreversible input terminal of a differential amplifier 129 through a switch 122 switched for each horizontal scanning line. On the other hand, the brightness signal Y fed from the processing circuit 119 is fed to the reversible input terminal of the differential amplifier 129. Therefore, the red color difference signal R-Y and blue color difference signal B-Y are alternately output by each horizontal scanning line from the differential amplifier 129.

On the other hand, a microprocessor 131 is provided in the tone controlling circuit 117 to discriminate the kind of endoscope with the endoscope discriminating signal fed through the signal line. By the microprocessor 131, the red color signal controlling data $D_R$ and blue color signal controlling date $D_B$ determined in advance so as to obtain a proper tone in each endoscope are written respectively into the D/A converters 126 and 127 through a data bus 132. Here, the red color signal R and blue color signal B are input as controlled signals into the reference terminals $V_R$. In such a formation, signals corresponding respectively to the product of the red color signal R and control data $D_R$ and the product of the blue color signal B and control data $D_B$ are obtained from the output terminals $I_o$, respectively, of the D/A converters 126 and 127. That is to say, these D/A converters 126 and 127 form a multiplying D/A converter means. Thus, the red color difference signal R-Y and blue color difference signal B-Y most suitably adjust in response to the kind of the endoscope are alternately output for each horizontal scanning line from the tone circuit 121.

FIG. 10 shows the formation of a part of further another modification of the video signal processing circuit 28. In this modification, a terminal device 133 such as a keyboard is provided outside so that the red color signal controlling data $D_R$, blue color signal controlling data $D_B$ and any other data may be freely set through the microprocessor 131 by the key operation. Also, the manually input information as superposed with the compound video signal from the encoder 124 can be displayed as characters on the screen of the displaying device 30. By such a modification, in the standard state, the same as in the modification shown in FIG. 9, the tone is controlled to be most suitable for each kind of the endoscope by the endoscope discriminating signal but can be controlled by the terminal device 133 to be different from the standard state in response to the user. That is to say, the tone can be freely set depending on whether the user likes a somewhat reddish picture image or a somewhat bluish picture image. Also, as the control data can be confirmed by the character display on the displaying device, if the same control data are set each time, the picture image of the same tone will be obtained, the operation will be simple and an accurate observation will be made.

Figure 11:
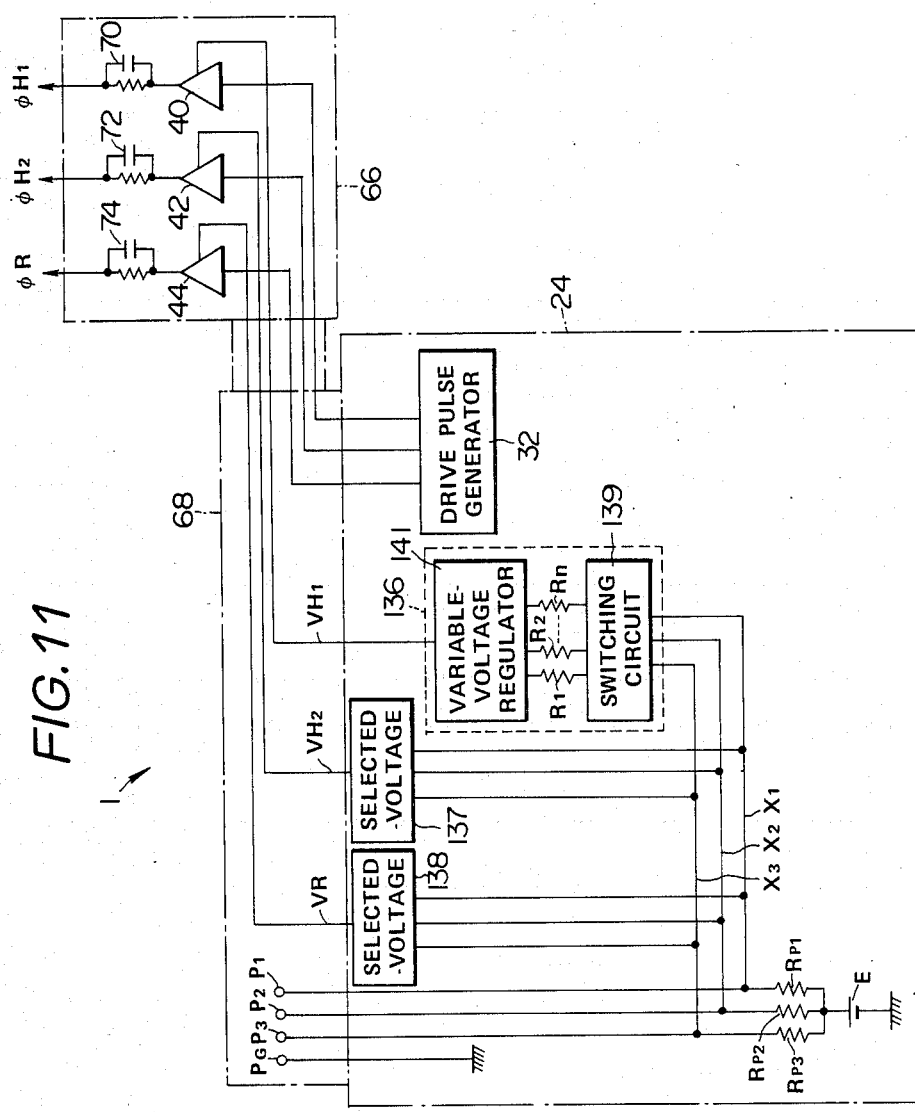
FIG. 11 is a block diagram of an electronic endoscope apparatus relating to the second embodiment of the present invention.

FIG. 11 is a block diagram of an electronic endoscope relating to the second embodiment of the present invention. Though not explained in the first embodiment, if the length of the signal line varies, not only the waveform but also the amplitude will attenuate. The higher the frequency of the signal, the higher this attenuation degree. Therefore, in order to apply the horizontal driving pulse, resetting pulse and vertical driving pulse all at a predetermined amplitude to the CCD 12, in case the length of the signal line is long, the output amplitudes of the horizontal driving circuits 40 and 42 and resetting driving circuit 44 must be made larger than in case the length of the signal line is short. Therefore, in the second embodiment, the current source voltages $VH_1$, $VH_2$ and VR to be fed respectively to the horizontal driving circuits 40 and 42 and resetting driving circuit 44 are generated respectively from selected voltage source circuits 136, 137 and 138 provided within the video processor 24.

Each of the selected current voltage source circuits 136, 137 and 138 consists of a switching circuit 139, n resistances $R_1$, $R_2$, —and $R_n$ and a variable voltage regulator 141. In the switching circuit 139, by switching signals $X_1$, $X_2$ and $X_3$ fed from outside, any one of the n (which is a number of the endoscopes to be used and is n+1 in this example) resistances $R_1$, $R_2$, —and $R_n$ is made effective but the others are made ineffective. The output voltage of the variable voltage regular 141 is determined by the resistance value of the resistance made effective. Therefore, the resistance values of the resistances $R_1$, $R_2$, —and $R_n$ are determined to be of values corresponding to the length of the endoscope.

The switching signals $X_1$, $X_2$ and $X_3$ are generated as follows. Contact pins $P_1$, $P_2$, $P_3$ and $P_G$ are provided within the signal connector 68. The contact pins $P_1$, $P_2$ and $P_3$ are connected to the current source E respectively through resistances $R_{P1}$, $R_{P2}$ and $R_{P3}$. The contact pin $P_G$ is grounded. The switching signals $X_1$, $X_2$ and $X_3$ are generated respectively from the connecting points of the resistances $R_{P1}$, $R_{P2}$ and $R_{P3}$ with the contact pins $P_1$, $P_2$ and $P_3$. The contact pins $P_1$, $P_2$ and $P_3$ within the signal connector 68 are opened or grounded (connected to the contact pin $P_6$) in response to the kind (length) of the endoscope. For example, in case the contact pins $P_1$, $P_2$ and $P_3$ are all opened, the switching signals $X_1$, $X_2$ and $X_3$ will be all on the current souce level (high level). In case any of the contact pins $P_1$, $P_2$ and $P_3$ is earthed, the switching signals $X_1$, $X_2$ and $X_3$ corresponding to the grounded contact pins $P_1$, $P_2$ and $P_3$ will be on the grounding level (low level). Therefore, the switching signals $X_1$, $X_2$ and $X_3$ can take in all $2^3 = 8$ states and can therefore correspond to eight kinds of endoscopes in all. The other parts not illustrated are the same as in the first embodiment.

Thus, according to the second embodiment, not only the distortion of the waveform but also the attenuation of the amplitude when transmitted through the signal line can be compensated.

This invention is not limited to the above described embodiments but can be variously modified in a range not deviating from the subject matter of the invention. For example, the vertical driving pulse may be compensated the same. The light source device and video processor may be integral with each other.

Further, this invention is not restricted by its specific working modes except being limited by the appended claims.

What is claimed is:

1. An electronic endoscope apparatus comprising:
   an endoscope having a solid state imaging device in a tip part;
   a light source means for generating an illuminating light;
   a light guide means inserted through said endoscope and transmitting the illuminating light;
   a light source connector provided on an incident end surface side of said light guide means;
   a control device generating a plurality of driving pulses to said solid state imaging device and processing a signal obtained from said solid state imaging device; and
   a waveform compensating means provided within said light source connector and compensating in advance a distortion of a waveform when at least one driving pulse among said plurality of driving pulses is transmitted to said solid state imaging device.

2. An electronic endoscope apparatus according to claim 1 wherein said control device is provided with said light source and a video processor provided separately from each other.

3. An electronic endoscope apparatus comprising:
   an electronic endoscope having
      an elongated insertable part,
      a light guide means inserted through said insertable part and transmitting an illuminating light,
      a light source connector provided on an incident end surface side of said light guide means,
      an imaging means imaging with a solid state imaging device an object illuminated by said light guide means;
      a signal line connected with said solid state imaging device and inserted through said insertable part,
      a signal connector fitted to an end of said signal line,
      an information signal generating means provided within said signal connector and generating an information signal relating to a length of the signal line inserted through the electronic endoscope, and
      a waveform compensating means compensating in advance distortion of a waveform of at least one driving pulse among a plurality of driving pulses applied to said solid state imaging device through said signal line and provided within said light source connector;
   a light source device having an illuminating light generating means capable of feeding an illuminating light to said light guide means and connected with said electronic endoscope; and
   a control device having
      a video signal processing circuit means connected with said signal line through said signal connector and processing an output signal of said solid state imaging device,
      a pulse generating means connected with said signal line through said signal connector and generating a plurality of driving pulses applied to the solid state imaging device through said signal line,
      a pulse delaying means delaying, with a plurality of different delay amounts, a reference pulse generated from said pulse generating means and outputting a plurality of different delayed pulses, and
      a selecting means decoding the information signal generated from said information signal generating means and selecting the delayed pulse corresponding to the length of the decoded signal line from among a plurality of delayed pulses generating by said pulse delaying means, and
      said control device being connected to said endoscope.

4. An electronic endoscope apparatus according to claim 3 wherein said information signal generating means generates the information signal depending on the manner of connecting contact pins.

5. An electronic endoscope apparatus according to claim 3 wherein said pulse delaying means is a delay line fitted with a plurality of tape outputting delayed pulses of respectively different delay amounts.

6. An electronic endoscope apparatus according to claim 3 wherein said selecting means is a multiplexer.

7. An electronic endoscope apparatus according to claim 3 wherein the delayed pulse selected by the selecting means controls the timing of the sampling of a sample holding circuit provided within said video signal processing circuit means.

8. An electronic endoscope apparatus comprising:
   an electronic endoscope having
      a light guide means inserted through an insertable part and transmitting an illuminating light,
      a light source connector provided on an incident end surface side of said light guide means, an imaging means imaging with a solid state imaging device an object illuminated by said light guide means, a signal line connected with said solid state imaging device and inserted through said insertable part, a signal connector fitted to an end of said signal line, an information signal generating means provided within said signal connector and generating an information signal relating to a length of the signal line inserted through the electronic endoscope and a spectral characteristic of said light guide means, and a waveform compensating means compensating in advance a distortion of a waveform of at least one driving pulse among a plurality of driving pulses applied to said solid state imaging device through said signal line and provided within said light source connector;

a light source device having an illuminating light generating means for feeding an illuminating light to said light guide means and connected with said electronic endoscope; and a control device having a video signal processing circuit means connected with said signal line through said signal connector and processing an output signal of said solid state imaging device, a pulse generating means connected with said signal line through said signal connector and generating a plurality of driving pulses applied to the solid state imaging device through said signal line, a pulse delaying means delaying with a plurality of different delay amounts a reference pulse generated from said pulse generating means and outputting a plurality of different delayed pulses, a discriminating means decoding an information signal generating from said information signal generating means, a selecting means selecting the delayed pulse corresponding to the length of the signal line and discriminated by said discriminating means from among a plurality of delayed pulses generated by said pulse delaying means and a tone controlling means controlling a tone with a spectral characteristic discriminated by said discriminating means, and said control device being connected to said endoscope.

9. An electronic endoscope apparatus according to claim 8 wherein said information generating means generates an information signal depending on a manner of connecting contact pins.

10. An electronic endoscope apparatus according to claim 8 wherein said pulse delaying means is a delay line fitted with a plurality of taps outputting delayed pulses of respectively different delay amounts.

11. An electronic endoscope apparatus according to claim 8 wherein said selecting means is a multiplexer.

12. An electronic endoscope apparatus according to claim 8 wherein the delayed pulse selected by the selecting means controls the timing of the sampling of a sample holding circuit provided within said video signal processing circuit means.

13. An electronic endoscope apparatus according to claim 8 wherein said tone controlling means controls the tone circuit provided within said video signal processing circuit means.

14. An electronic endoscope apparatus according to claim 8 wherein said tone controlling means outputs a tone controlling signal with a microprocessor.

15. An electronic endoscope apparatus according to claim 8 wherein said tone controlling means can input a tone adjusting signal from a terminal device.

16. An electronic endoscope apparatus comprising:

an electronic endoscope having an elongated insertable part, a light guide means inserted through said insertable part and transmitting an illuminating light, a light source connector provided on an incident end surface side of said light guide means, an imaging means imaging with a solid state imaging device an object illuminated by said light guide means;

a signal line connected with said solid state imaging device and inserted through said insertable part, a signal connector fitted to an end of said signal line, an information signal generating means provided within said signal connector and generating an information signal relating to a length of the signal line inserted through the electronic endoscope, a waveform compensating means provided within said light source connected and compensatingn in advance a distortion of a waveform of at least one driving pulse among a plurality of driving pulses applied to said solid state imaging device through said signal line, and an amplifying means provided within said light source connector and compensating in advance an attenuation of an amplitude of at least one driving pulse among said plurality of driving pulses transmitted to said solid state imaging device;

a light source device having an illuminating light generating means capable of feeding an illuminating light to said light guide means and connected wiht said electronic endoscope; and a control device having a video signal processing circuit means connected with said signal line through said signal connector and processing an output signal of said solid state imaging device, a pulse generating means connected with said signal line through said signal connector and generating a plurality of driving pulses applied to the solid state imaging device through said signal line, a pulse delaying means delaying, with a plurality of different delay amounts, a reference pulse generated from said pulse generating means and outputting a plurality of different delayed pulses, a discriminating means decoding an information signal generated from said information signal generating means, a selecting means selecting the delayed pulse corresponding to the length of the signal line and discriminated by said discriminating means from among a plurality of delayed pulses generated by said pulse delaying means, and a voltage selecting means decoding said information signal and varying a voltage fed to said amplifying means, and said control device being connected to said endoscope.

17. An electronic endoscope apparatus according to claim 16 wherein said information signal generating means generates the information signal depending on a manner of connecting contact pins.

18. An electronic endoscope apparatus according to claim 16 wherein said pulse delaying means is a delay line fitted with a plurality of taps outputting delayed pulses of respectively different delay amounts.

19. An electronic endoscope apparatus according to claim 16 wherein said selecting means is a multiplexer.

20. An electronic endoscope apparatus according to claim 16 wherein the delayed pulse selected by the selecting means controls a timing of the sampling of a sample holding circuit provided within said video signal processing circuit means.

* * * * *